(No Model.)  3 Sheets—Sheet 1.
J. HALLAHAN.
COMBINED HAY LOADER AND RAKE.
No. 537,033. Patented Apr. 9, 1895.
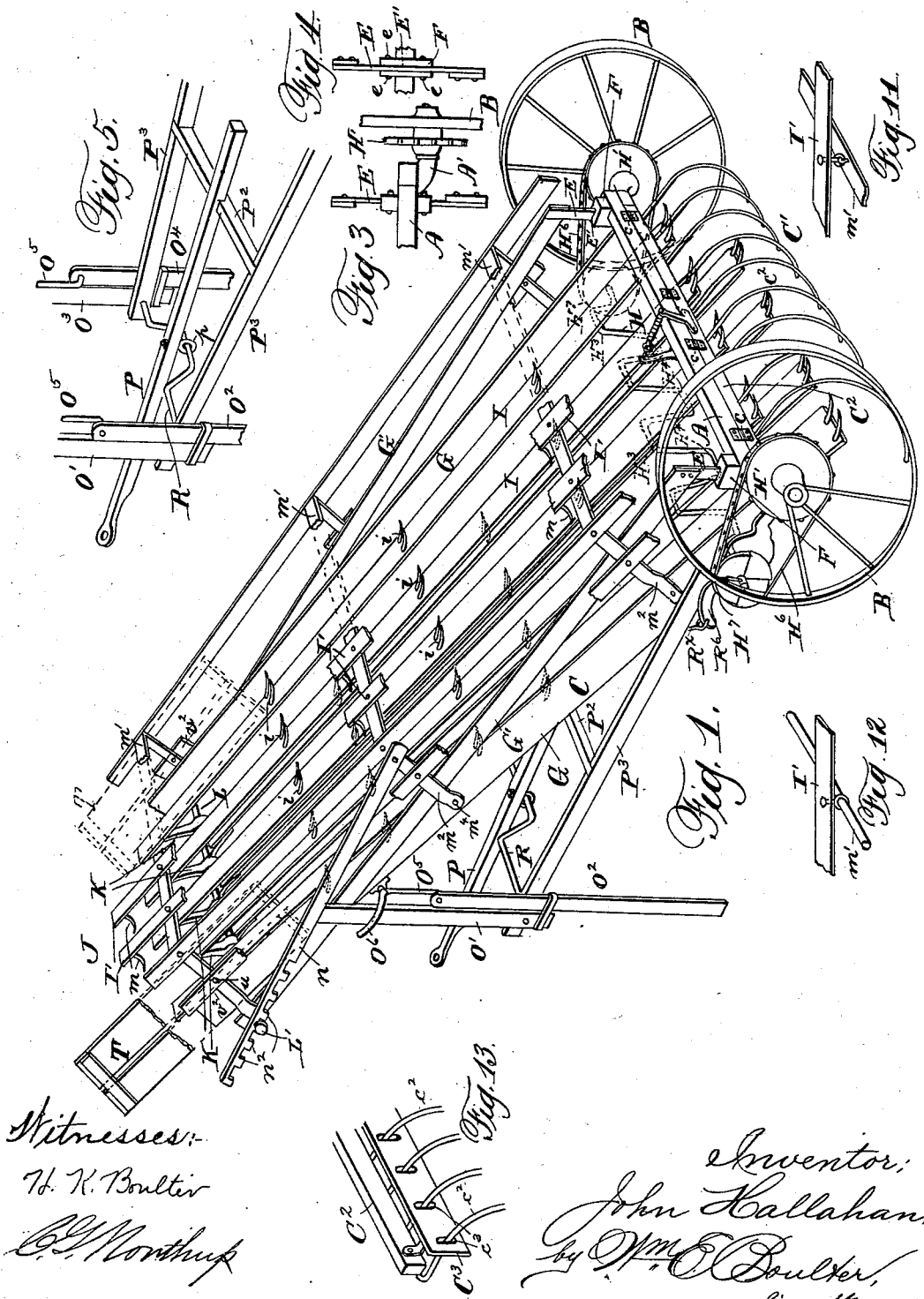
Witnesses:
H. K. Boulter
C. L. Northup
Inventor:
John Hallahan,
by Wm. C. Boulter,
his attorney
THE NORRIS PETERS CO., PHOTO-LITHO., WASHINGTON, D. C.

(No Model.) 3 Sheets—Sheet 2.
J. HALLAHAN.
COMBINED HAY LOADER AND RAKE.
No. 537,033. Patented Apr. 9, 1895.
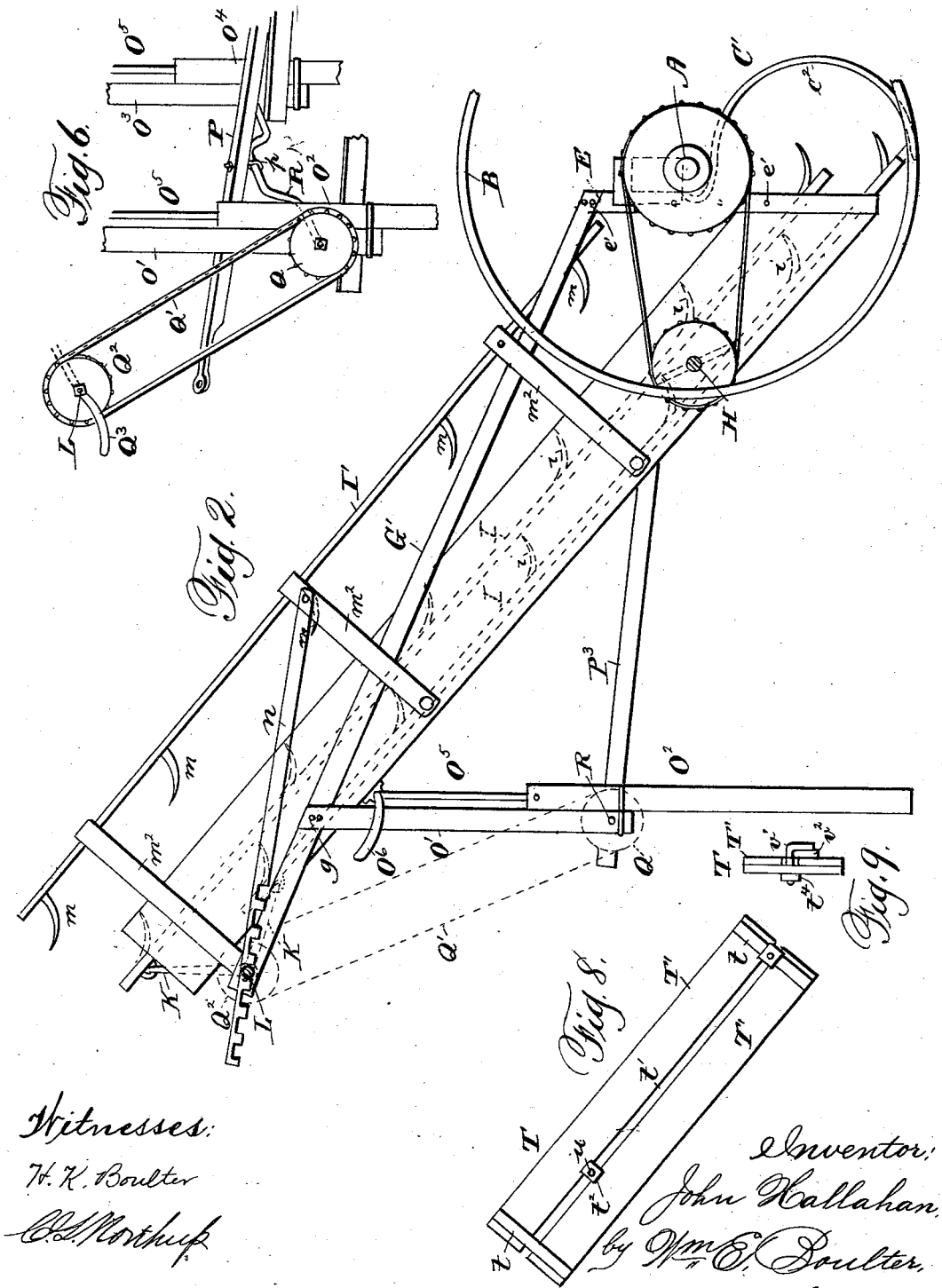

(No Model.) 3 Sheets—Sheet 3.
J. HALLAHAN.
COMBINED HAY LOADER AND RAKE.
No. 537,033. Patented Apr. 9, 1895.
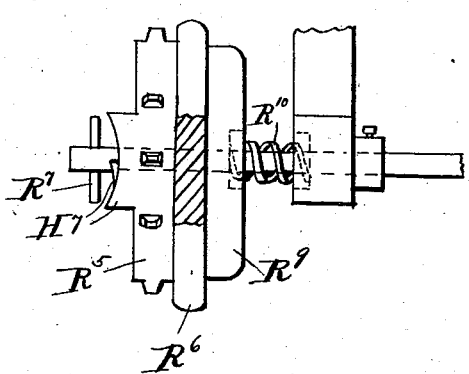
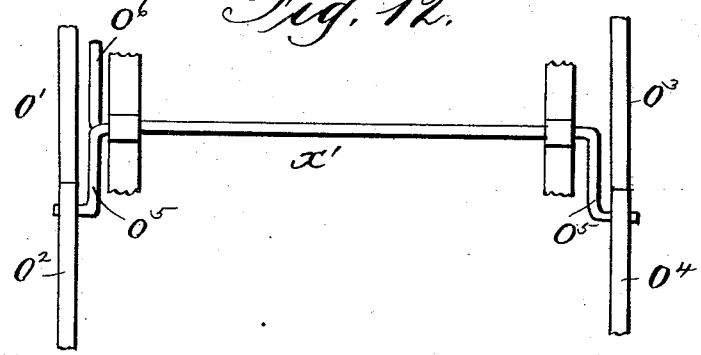
Witnesses:
H. K. Boulter
O. G. Northup
Inventor:
John Hallahan,
By Wm. E. Boulter,
Attorney

UNITED STATES PATENT OFFICE.

JOHN HALLAHAN, OF MELLERAY, IOWA.

COMBINED HAY LOADER AND RAKE.

SPECIFICATION forming part of Letters Patent No. 537,033, dated April 9, 1895.

Application filed October 6, 1893. Serial No. 487,275. (No model.)

*To all whom it may concern:*

Be it known that I, JOHN HALLAHAN, a citizen of the United States, residing at Melleray, in the county of Dubuque and State of Iowa, have invented certain new and useful Improvements in a Combined Hay Loader and Rake; and I do hereby declare the following to be a full, clear, and exact description of the invention, such as will enable others skilled in the art to which it appertains to make and use the same.

My invention has relation to combined hay-loaders and rakes, and among the objects in view is to provide a strong, durable, and efficient hay loader and rake by means of which the hay may be raked from the ground and then loaded upon the hay-wagon to which the machine is to be attached.

My invention consists in the novel construction, arrangement and combination of parts, as hereinafter fully described, illustrated in the accompanying drawings, and pointed out in the appended claims.

In the drawings:—Figure 1 is a perspective view of my combined hay-loader and rake, parts thereof being broken away and the operating means for the shaft R being omitted. Fig. 2 is a side elevation thereof. Fig. 3 is a detail view of a portion of the axle, sprocket wheel and adjustable standard. Fig. 4 is a rear elevation of the adjustable standard and the shoulder on the axle. Fig. 5 is a perspective view of a portion of the beam and the means for supporting the forward end of the same. Fig. 6 is a like view of said parts and the means for adjusting the beam. Fig. 7 is a detail perspective view of the yielding connection for the rake. Fig. 8 is a side view of a wind break adapted for use with my hay-loader and rake. Fig. 9 is an edge view thereof. Fig. 10 is a perspective view on an enlarged scale of the clutch device. Fig. 11 is an end view thereof, showing the pin out of engagement with the clutch teeth. Fig. 12 is a front view of the means for supporting the front end of the loader frame. Fig. 13 is a perspective view showing means for preventing the accumulation of hay at the upper ends of the rake teeth.

The frame of my machine is supported at its rear end from an axle A, which is provided near each end with a downwardly-extending portion A' upon which are mounted the ground wheels B, B. The frame C of the loader consists of the laterally-arranged bars G, G, and G', G'. The bars G, G, are considerably greater in width than the bars G' G', the latter extending at an angle to and crossing the bars G, G, (Fig. 2) and to which they are bolted as at $g$. The rear ends of the several bars are connected together by means of standards E, which are adjustably mounted by means of bolts $e$, and perforations $e'$ in grooves E' formed in shoulders F which are secured to the axle A. Thus the rear end of the loader frame may be adjusted vertically when desired, with respect to the supporting axle.

C' indicates the rake which I use in connection with the loader, the rake-head $C^2$ of the same being hinged as at $c$, to the rear side of the axle, the rake teeth $c^2$ curving downwardly and forwardly, as shown, in the proper position to rake the hay.

The rake is yieldingly held in the raking position by means of the device shown in Fig. 7 which consists of the upwardly extending arms $c^3$, $c^4$, secured to the axle and rake-head respectively.

$c^5$ is a rod which passes through a slot $c^{10}$ in the arm $c^4$ and held therein by a nut $x$. The rod $c^5$ has an enlargement $c^{11}$, affording a bearing for the spring $c^6$.

$c^9$ is an opening and $c^{13}$ is a lip or flange having an eye or ring $c^{14}$ to which a cord or wire may be attached to enable the operator to raise the rake sufficiently high above the ground to avoid obstructions or when the machine is traveling over a road.

The rod $c^6$ is attached to the arm $c^3$ by passing through an opening therein said rod being hooked for the purpose and being keyed in position as at $c^{15}$. The other end of the rod $c^6$ passes through the opening $c^9$ and is keyed in position as at $c^{16}$, the lip or flange $c^{13}$ overlapping the upper side of the rod $c^6$, so that when the operating rope or cord is pulled upon to raise the rake the lip $c^{13}$ slides along the rod $c^6$ (said lip being independent and separate from said rod).

I indicates a series of slats arranged longitudinally of the loader frame and between the bars thereof, and which slats are narrowed somewhat toward their forward ends and also gradually approach each other whereby to conform to the narrowed forward end of the loader frame. The rear ends of the slats I are pivotally mounted upon the cranks $H^3 H^4$ of a crank shaft H, which extends transversely of the loader frame and mounted in the side bars thereof. The number of cranks corresponds to the number of slats, there being one crank for each slat, and the said slats are pivoted to the cranks in an alternate manner as shown. The forward ends of the slats are secured to arms K which are loosely mounted upon a rod L which extends transversely of the frame, and pivoted in the side arms G' thereof.

The upper sides of the slats I are provided at suitable intervals with upwardly-curved teeth $i$, which are pointed at their outer ends and slightly curved and which are inclined in the manner shown, whereby to receive and hold the hay as it is gathered by the rake. Thus it will be seen that when the shaft H is properly rotated, the rear ends of the slats will be caused to have a rotary motion also, thus imparting a rising and forward, and then downward and rearward movement to the slats to thus properly and successively advance the hay until it reaches the delivery or front end of the slats, whence it falls into the wagon. Thus, while one series of slats is rising and advancing the hay upwardly along the loader, the other series of slats will have freed the hay which it had previously advanced and be descending and moving rearwardly to advance another portion of hay. In this manner the two series of slats co-operate to successively advance the hay toward the outlet J.

For imparting the described movements to the slats any suitable means may be employed, though I prefer to employ an arrangement of means whereby the desired movements may be obtained from and by the rotation of the ground wheels, such arrangement being as follows: H' H' indicate sprocket wheels secured upon the inner side of the hubs of the wheels B, B, said sprocket wheels being geared by means of sprocket chains $H^6$ to sprocket wheels $H^7 H^7$, mounted upon the projecting ends of the crank shaft H, so that when the machine is traveling over a field the crankshaft will be rotated to effect the desired movements of the slats, as will be understood.

For the purpose of throwing the sprocket wheels out of gear whenever this may be necessary or desirable any suitable clutch device may be employed, as for instance, that shown in Figs. 10, and 11, and which consists of a pin $R^7$ secured to the shaft $H^3$, a sprocket wheel $R^5$ having clutch teeth $H^7$ and made integral with a section $R^9$, said sprocket wheel and section $R^9$ being set loosely upon the shaft and therefore adapted to revolve on the latter.

$R^6$ is a lever or yoke engaging the section $R^9$, and $R^{10}$ is a spring coiled upon the shaft and bearing upon the parts so as to normally throw the clutch teeth into engagement with the pin $R^7$ so that when raking, the pin is caught in said teeth and thus revolves the shaft. When, however, the operator desires to turn a corner or move across a field without raking, or when on a road, he simply operates a cord or rope $R^\times$, seen in Fig. 1, attached to the lever $R^6$ to cause the parts to slide along the shaft to free the clutch teeth from the pin $R^7$ whereby said shaft $H^3$ will not be turned. The spring $R^{10}$ has its bearings at one end upon the section $R^9$ and at the opposite end upon the box or bearing in which the shaft revolves.

The described clutch devices are, of course, located at both ends of the shaft.

For the purpose of pressing the hay down upon the slats while being elevated thereby and thus prevent said hay from being blown off the slats as is likely to occur during windy weather, I employ a series of slats I' provided upon their under side with teeth $m$, curving downwardly and forwardly as shown so as not to interfere with the upward movement of the hay. To the slats I' are loosely connected the transverse bars $m'$ the connection between said parts being effected by any suitable means, as for instance by an eyebolt and hook, as seen in Fig. 11; or the bars $m'$ may be round rods and passing loosely through eyebolts on the slats I' as seen in Fig. 12. The bars $m'$ are secured at their ends to the bars $m^2$ pivotally connected at their lower ends to the side bars G, G, of the loader frame by means of pivot bolts $m^4$, the foremost bar $m^2$ being pivotally mounted upon the shaft L.

For the purpose of oscillating the bars to cause the slats I' to press the hay down upon the slats I, as during windy weather, and maintaining the parts in the position for effecting the desired purpose, I pivotally secure one end of a rod $n$, to one of the bars $m^2$, and provide the said rod with a series of teeth $n^2$, with which the extended end L' of the shaft L may be made to engage. Thus by adjusting the rod forward or backward to effect the engagement of the end L' with the teeth, the slats I' will be lowered or raised, as is obvious.

For the purpose of supporting the front end of the loader when the same is detached from the wagon I employ any suitable means, preferably that shown which consists of rods $O' O^2 O^3 O^4$ upon opposite sides of the loader, the upper end of the rods $O' O^3$ being secured to the loader and the lower end of the rods $O^2 O^4$ being adapted to rest upon the ground. The upper ends of the rods $O^2 O^4$ are pivotally mounted each upon the bent end of a crank arm $O^5$ of a shaft $x'$, having bearings in the loader frame and which shaft is also provided with an integral operating crank arm or handle $O^6$, so that by first sliding the bails $O^{10}$ to cause them to free the legs $O^2 O^4$, and then swinging the handle $O^6$ to the left in Fig. 1, the legs $O^2 O^4$ will be raised or swung clear of the ground which is necessary when the loader is attached to the wagon or operating upon the field.

The loader is adapted to be connected to an ordinary hay-wagon by means of a beam P, which is made adjustable vertically so as to adapt the loader for attachment to wagons of varying heights. Said beam P is connected at its rear end to a bar $P^2$ secured to the side bars $P^3$ carried by the frame and is provided toward its forward end with an eye $p$, through which passes the crank portion of a shaft R having bearings at its ends in the lower ends of the rods $O'$ $O^3$. Upon the end of the shaft R projecting beyond the rod $O^3$ I mount a sprocket wheel Q geared by a sprocket chain $Q'$ with a sprocket wheel $Q^2$ mounted on an end of shaft L. By means of an operating crank $Q^3$ secured to the wheel $Q^2$ (as seen in Fig. 6) the shaft R may be turned to raise or lower the beam P as will be understood.

In Fig. 8 I show an adjustable wind-break T which is adapted to be used in connection with my machine, and which is formed of sections $T'$, $T'$, connected at their ends by bars $t$, and leaving an opening or slot $t'$ between them, within which is adapted to work the bolt $u$, secured to the frame, and being retained therein by a nut $t^2$. The wind-break is attached to the loader frame by means of a right-angled bolt $v'$ provided with a nut $t^4$, said bolt engaging over the side slat $v^2$. Thus the wind-break may be adjusted longitudinally and then secured in the adjusted positions by means of the nuts.

If it be desired to use the rake independently of the loader, this may be done by detaching the standards E, E, and attaching to the axle a pole for a team and a lever for operating the rake.

To prevent the lodging of hay at the upper ends of the rake teeth, I may employ a board $C^3$ arranged vertically in rear of the axle of the machine and about eight inches therefrom, said board being suitably secured to the rake head and being provided with slots $c^3$ through which pass the rake teeth, as shown in Fig. 13.

What I claim, and desire to secure by Letters Patent, is—

1. In a combined hay-loader and rake, the combination with the supporting axle, of a rake hinged thereto, and a loader frame detachably connected to said axle, and adapted to be adjusted vertically at its rear end relatively to the axle, as described.

2. In a combined hay-loader and rake, the combination with the supporting axle, of a rake hinged thereto, vertically-arranged standards adjustably and detachably secured to the axle, and a loader-frame secured at its rear end to the standards, as and for the purpose specified.

3. In a combined hay-loader and rake, the combination with the supporting axle, of a rake hinged thereto, shoulders on said axle provided with vertical grooves, vertically-arranged standards located in said grooves and provided with perforations a bolt adapted to take in said perforations, and a loader frame secured at its rear end to the standards, as and for the purpose specified.

4. In a combined hay-loader and rake, the combination with the supporting axle, of a loader-frame supported thereby, and having movable toothed slats as described, and a device for retaining the hay upon the loader slats comprising slats and standards to the upper ends of which the latter slats are secured, the lower ends of the standards being pivotally connected to the loader frame, as and for the purpose specified.

5. In a combined hay-loader and rake, the combination with the supporting axle, of a loader frame carried thereby and having movable toothed slats as described, a series of slats for retaining the hay upon the loader slats, and secured to standards pivoted to the loader frame, a rod pivoted to one of said standards, and having teeth near its opposite end and a shaft adapted to engage the teeth of said rod, as and for the purpose specified.

6. In a combined hay-loader and rake, the combination with the supporting axle, of a loader frame carried thereby and a wind-break adjustable longitudinally on the frame and comprising sections arranged to form a slot between them, a rod or bolt carried by the frame and adapted to work in said slot, and means for adjustably connecting the sections to the loader frame, as and for the purpose specified.

In testimony whereof I affix my signature in presence of two witnesses.

JOHN HALLAHAN.

Witnesses:
ALEX SIMPLOT,
JAMES PLAISTER.